United States Patent [19]

Tsikos

[11] Patent Number: 4,547,668

[45] Date of Patent: Oct. 15, 1985

[54] TWO-DIMENSIONAL PRESSURE SENSOR USING RETRO-REFLECTIVE TAPE AND SEMI-TRANSPARENT MEDIUM

[75] Inventor: Constantine Tsikos, Pennsauken, N.J.

[73] Assignee: Siemens Corporate Research & Support, Inc., Iselin, N.J.

[21] Appl. No.: 531,984

[22] Filed: Sep. 14, 1983

[51] Int. Cl.⁴ .................. G01D 5/34; G01B 11/14
[52] U.S. Cl. .................. 250/231 P; 250/227; 73/705; 350/96.25
[58] Field of Search .......... 250/231 P, 227, 221; 73/705; 350/96.15, 96.20; 340/365 P; 356/71, 375

[56] References Cited

U.S. PATENT DOCUMENTS

| | | | |
|---|---|---|---|
| 3,327,584 | 6/1967 | Kissinger | 250/227 |
| 3,987,668 | 10/1976 | Popenoe | 73/88 F |
| 4,078,432 | 3/1978 | Stewart | 73/705 |
| 4,158,310 | 6/1979 | Ho | 73/705 |
| 4,210,029 | 7/1980 | Porter | 73/705 |
| 4,269,069 | 5/1981 | Handtmann et al. | 73/705 |
| 4,322,163 | 3/1982 | Schiller | 356/71 |
| 4,322,978 | 4/1982 | Fromm | 73/705 |
| 4,322,979 | 4/1982 | Fromm | 73/705 |
| 4,354,389 | 10/1982 | Baillie | 73/749 |
| 4,358,960 | 11/1982 | Porter | 73/705 |

FOREIGN PATENT DOCUMENTS 2450080 4/1976 Fed. Rep. of Germany .
2918413 11/1980 Fed. Rep. of Germany .
2098726 11/1982 United Kingdom .

*Primary Examiner*—John K. Corbin
*Assistant Examiner*—R. Eyssallenne
*Attorney, Agent, or Firm*—John Francis Moran

[57] ABSTRACT

This invention is a two-dimensional pressure sensor which can be used to determine a pressure distribution across a two-dimensional object which comes in contact with the sensor. The sensor includes a light source, a matrix of light transmitting fiber endings which includes an alternate pattern of transmitting and receiving light fibers, a transmitting fiber sub-array located a distance from the matrix and composed of transmitting fibers, a receiving fiber sub-array located a distance from the matrix and composed of receiving fibers, a semi-transparent deformable medium located above the matrix, a retro-reflective material located on top of the deformable medium, a flexible membrane located adjacent said retro-reflective material and positioned to contact an object, and apparatus such as a photodetector array, for detecting light which is reflected by the retro-reflective material and transmitted to the receiving fiber sub-array.

7 Claims, 5 Drawing Figures

TWO-DIMENSIONAL PRESSURE SENSOR USING RETRO-REFLECTIVE TAPE AND SEMI-TRANSPARENT MEDIUM

BACKGROUND OF THE INVENTION

This invention relates to an optical pressure sensor which can be used to determine a pressure distribution which defines the shape of a two dimensional object.

Existing optical pressure sensors determine the overall or macro-pressure across a surface, but not the pressure differences across the surface.

SUMMARY OF THE INVENTION

It is an object of the present invention to provide apparatus for optically determining the shape of an object.

It is a further object of the invention to provide an apparatus which can optically determine differences in pressure across a surface which is in contact with an object.

It is a further object of the invention to provide apparatus which can optically determine the magnitude of a force.

It is a further object of the invention to provide apparatus which can be used as a tactile sensor for a robotic device.

The invention features, a two-dimensional pressure sensor, having a light source; a matrix of light transmitting fiber endings having a plurality of fibers for transmitting light from the light source, and a plurality of fibers for receiving reflected light; a transmitting fiber sub-array, having endings of the transmitting fibers located a distance from the matrix of light transmitting fiber endings, the endings being located to receive light from the light source; a receiving fiber sub-array, having endings of the receiving fibers located a distance from the matrix of light transmitting fiber endings; a retro-reflective material located a distance above the matrix; a semi-transparent deformable medium located between the matrix and the retro-reflective material, so that the semi-transparent deformable medium supports the retro-reflective material; a flexible membrane located adjacent to the retro-reflective material side which is farthest from the matrix; and the means, located adjacent to the receiving fiber sub-array, for detecting reflected light transmitted by the light fibers from the matrix to the receiving fiber sub-array.

In preferred embodiments of the sensor the retro-reflective material is an adhesively backed sheet which is affixed to the flexible membrane; the semi-transparent deformable medium is heavy ink; the semi-transparent deformable medium is graphite oil; the flexible membrane is a silcone elastomer; the light transmitting fibers are glass fibers; the matrix includes rows and columns of fibers which alternately are transmitting fibers, which extend from the matrix to the transmitting fiber sub-array, and receiving fibers, which extend from the matrix to the receiving fiber sub-array.

Other features and advantages of the present invention will become apparent from the following detailed description, and from the claims.

For a full understanding of the present invention, reference should now be made to the following detailed description and to the accompanying drawings.

DETAILED DESCRIPTION

Figure 1:
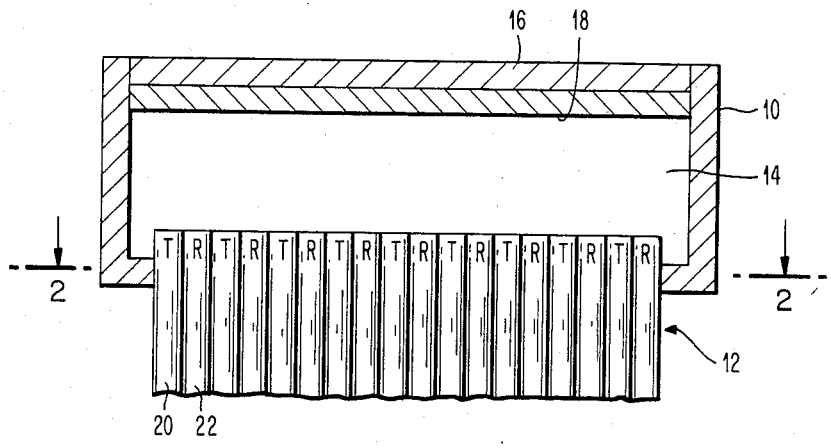
FIG. 1 is a cross sectional diagrammatic view of the pressure sensor apparatus shown without the receiving and transmitting fiber sub-arrays.

Referring to FIG. 1, container 10 houses light fiber matrix 12 and semi-transparent deformable medium 14. Flexible membrane 16 and retro-reflective material 18 form a cover for the top of container 10.

Typically the semi-transparent deformable medium can be heavy or graphite oil which occupies all the space in the container and is in direct contact with the retro-reflective material and the light fiber matrix. These materials are particularly suitable because the greater the thickness (the distance between the matrix and the retro-reflective material) the greater the absorption coefficient.

Flexible membrane 16 can typically be made of silicone elastomer such as commercially available silicone rubber.

Retro-reflective material 18, which reflects radiation from the originating source back to the originating source, can be directly applied to the underside of flexible membrane 16. Alternately, the retro-reflective material can be manufactured in the form of an adhesive tape which is applied to the underside of flexible membrane 16. Suitable retro-reflective tape is available, for example, from Spartan Plastics, Inc., P.O. Box 67, Holt, Mich. 48842.

Figure 2:
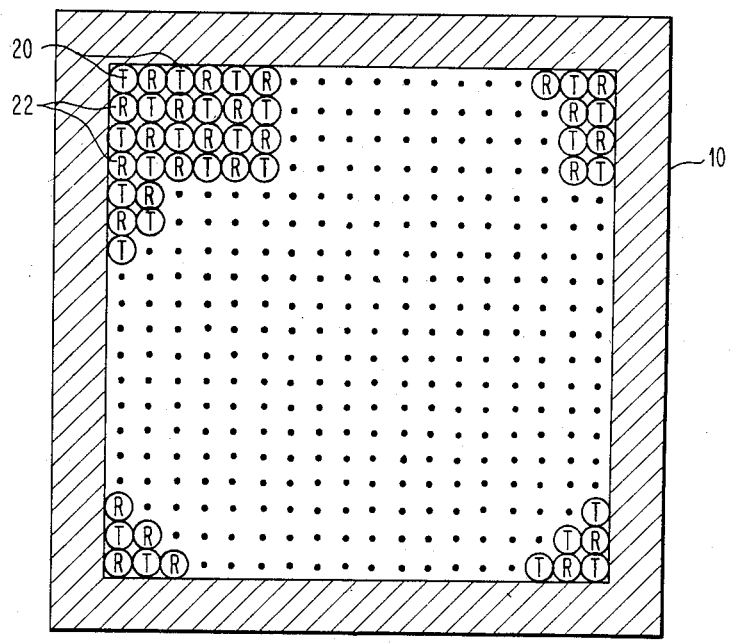
FIG. 2 is a top view of the light fiber matrix.

Referring to FIGS. 1 and 2, matrix 12 is shown composed of light transmitting fibers 20, for transmitting light from a remote light source (not shown) to the flexible membrane, and light receiving fibers 22 for receiving light reflected from the flexible membrane to the matrix. The fibers are arranged in matrix 12 so that each row and column of fiber endings alternates between transmitting fibers (designated "T") 20 and receiving fibers (designated "R") 22.

Figure 3:
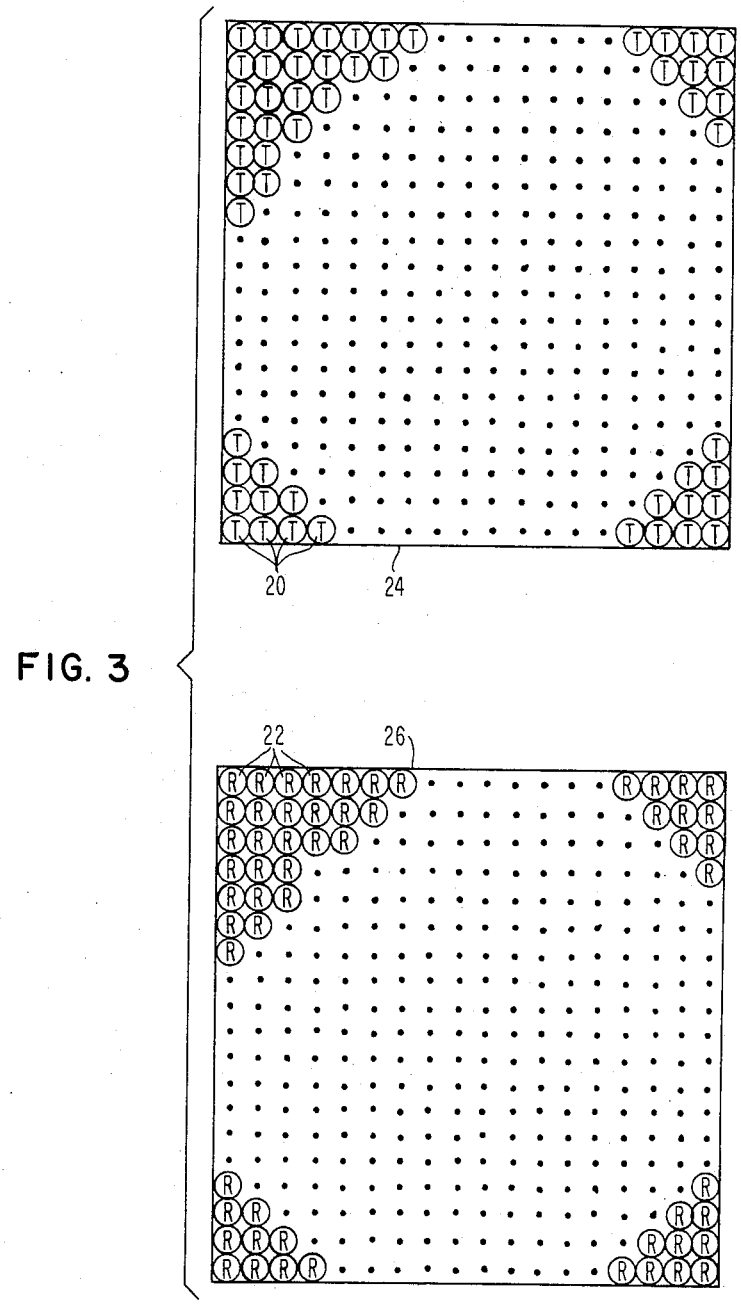
FIG. 3 is a diagrammatic view of the transmitting fiber sub-array and the receiving fiber sub-array, which are both attached to the light fiber matrix.

The transmitting and receiving fiber endings, remote from matrix 12, terminate in transmitting fiber sub-array 24 and receiving fiber sub-array 26, respectively, as shown in FIG. 3.

The operation of the pressure sensor will now be described in detail with particular references to FIGS. 4 and 5.

Figure 4:
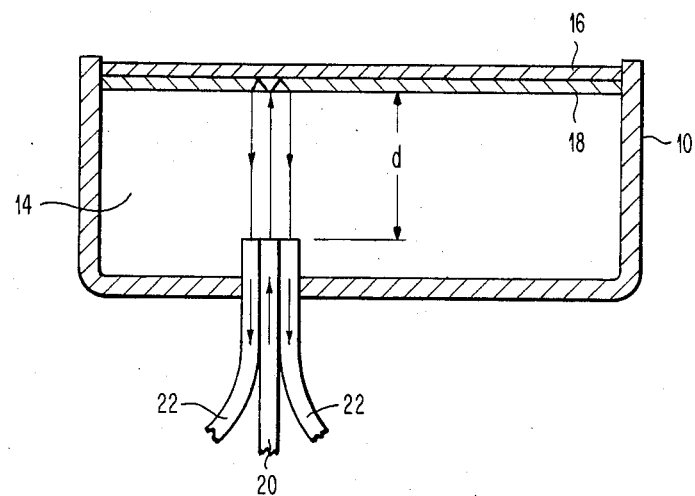
FIG. 4 is a cross sectional diagrammatic view of the pressure sensor showing the light path between a single transmitting fiber and two receiving fibers.

FIG. 4, which shows the purposes of clarity only one transmitting fiber 20 and two receiving fibers 22, indicates the path of the light transmitted from and received by these fibers. Initially, light from a light source, such as an incandescent bulb (not shown) is carried by light transmitting fibers 20, and transmitted through semi-transparent deformable medium 14 and retro-reflective material 18 to flexible membrane 16. The light is then reflected by the flexible membrane, due to the action of the retro-reflective material, directly back to receiving fibers 22 which are adjacent to the transmitting fiber.

Figure 5:
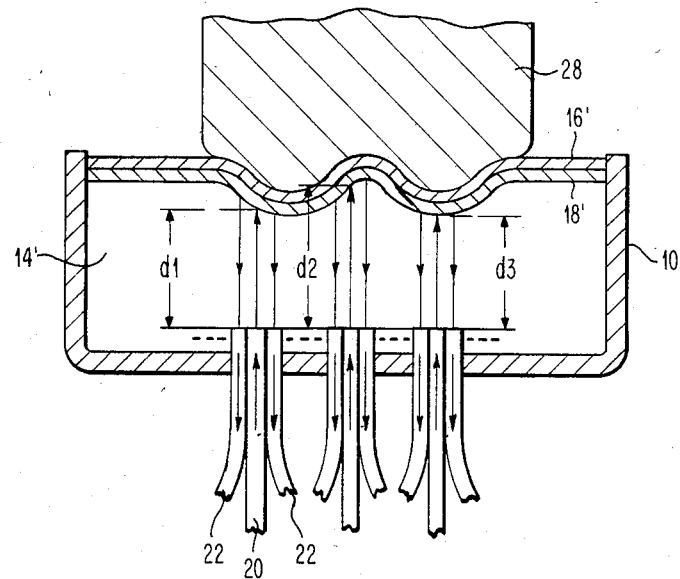
FIG. 5 is a cross sectional diagrammatic view of the pressure sensor showing the effect of an object contacting the sensor.

When an object, such as object 28 shown in FIG. 5, contacts flexible membrane 16, the membrane, retro-reflective material 18 and semi-transparent deformable medium 14, all deform in conformance with the object's shape. These materials in their deformed states are designated as 16', 18', and 14' respectively, in FIG. 5.

Based on the deformation resulting from contact with object 28, the light leaving different transmitting fibers 20 and returning to adjacent receiving fibers 22 will travel different distances through the semi-transparent deformable medium. In addition, depending upon the distance the light travels from a transmitting fiber to an adjacent receiving fiber, the intensity of the light transmitted by different receiving fibers to the receiving fiber sub-array will vary.

The relationship between the light intensity and the distance travelled through the semi-transparent deformable medium is expressed by Beer's law as follows:

$$I/I_0 = e^{-kL}$$

Where:
$I_0$ = initial intensity of light leaving each transmitting fiber 20;
$I$ = intensity of light transmitted through the semi-transparent deformable medium and received by receiving fiber 22;
$k$ = a physical constant which is defined by the characteristics of semi-transparent deformable medium 14; and
$L$ = thickness of the semi-transparent deformable medium the light passes through.

Therefore, applying the above equation to the invention yields the following:

$$I = I_0 e^{-k2d}$$

Where: $L = 2d$ (d is shown in FIGS. 4 and 5) because the light passes through the semi-transparent deformable medium twice between the time it leaves a transmitting fiber and is received by a receiving fiber.

If the equation is differentiated, then:

$$\frac{dI}{dL} = \frac{d}{dL}(I_0 e^{-2kd})$$

$$\frac{dI}{dL} = I_0 \frac{d}{dL}(e^{-2kd})$$

$$\frac{dI}{dL} = I_0 e^{-2kd} \frac{d}{dL}(-2kd)$$

Therefore, $\frac{dI}{dL} = -k I_0 e^{-2kd}$;

which means that the change in the intensity of the light transmitted through the semi-transparent deformable medium, with respect to the thickness of the medium (d), is inversely portional to the thickness of the medium.

If the thickness of the semi-transparent deformable medium is reduced by an amount equal to $\Delta L$ then;

$$I_1 = I_0 e^{-2k(d-\Delta L)}$$

Where: $I_1$ = intensity of light transmitted through the semi-transparent deformable medium whose thickness (d) has been reduced by an amount equal to $\Delta L$.

For the semi-transparent deformable medium of thickness d:

$$I_2 = I_0 e^{-2kd}$$

Where: $I_2$ = intensity of light transmitted through the semi-transparent medium of thickness d.

If the thickness of the semi-transparent deformable medium is increased by an amount equal to $\Delta L$, then:

$$I_3 = I_0 e^{-2k(d+\Delta L)}$$

Where: $I_3$ = intensity of light transmitted through the semi-transparent medium whose thickness (d) has been increased by an amount equal to $\Delta L$.

Therefore, subtracting $I_2$ from $I_1$ yields:

$$I_1 - I_2 = I_0[e^{-2k(d-\Delta L)} - e^{-2kd}]$$

$$I_1 - I_2 = I_0[e^{-2kd+2k(\Delta L)} - e^{-2kd}]$$

$$I_1 - I_2 = I_0[(e^{-2kd}e^{2k\Delta L}) - e^{-2kd}]$$

$$I_1 - I_2 = I_0 e^{-2kd}[e^{2k\Delta L} - 1]$$

Therefore, the difference in intensity ($\Delta I = I_1 - I_2$) is portional to the difference in thickness ($\Delta L$) and inversely portional to the initial thickness (d).

The initial intensity ($I_0$) of the light can be easily determined by measuring the intensity of the light source (not shown) which is incident upon the transmitting fiber sub-array minus any correction factor due to transmission loss resulting from the transmission of the light over the light transmission fibers.

The intensity of the light after it passes through the semi-transparent deformable medium can then be measured at the receiving fiber sub-array by conventional means, such as with a photodetector array in which individual photodetectors measure the intensity of light emitted by each fiber of the sub-array. Again, any transmission loss between the matrix and the receiving fiber sub-array can be accounted for by a correction factor.

Once the initial light intensity and the light intensity of the light emerging from various fibers of the receiving fiber sub-array are determined, the thickness (d) of various portions of the semi-transparent deformable can be determined. Therefore, since the flexible membrane, the retro-reflective material, and the semi-transparent deformable medium all deform in accordance with object 28, the shape of the object surface contacting the flexible membrane can be determined from the thickness (d) of various portions of the semi-transparent deformable medium.

Similarly, the pressure distribution across the flexible membrane caused by the object can also be determined from the thickness of various portions of the semi-transparent deformable medium.

In an alternate embodiment the pressure sensor can be used to determine the magnitude of a force exerted against the flexible membrane. This is accomplished by measuring the change in intensity, and then computing the change in thickness of the semi-transparent deformable medium which is calibrated to indicate the force exerted against the flexible membrane.

In another embodiment the pressure sensor can be incorporated into a robotic device, and utilized to determine the shape of an object encountered by the robotic device.

There has thus been shown and described a novel two-dimensional pressure sensor which fulfills all the object and advantages sought. Many changes, modifications, variations and other uses and application of the subject invention will, however, become apparent to those skilled in the art after considering this specification which discloses embodiments thereof. All such changes, modifications, variations and other uses and applications which do not depart from the spirit and scope of the invention are deemed to be covered by the invention which is limited only by the claims which follow.

I claim:

1. A two-dimensional pressure sensor, comprising:
   (a) a light source;
   (b) a matrix of light transmitting fiber endings comprising a plurality of fibers for transmitting said light from said light source and a plurality of fibers for receiving reflected light;
   (c) a transmitting fiber sub-array comprising endings of said transmitting fibers located a distance from said matrix of light transmitting fiber endings, said endings located to receive light from said light source;
   (d) a receiving fiber sub-array, comprising endings of said receiving fibers located a distance from said matrix of light transmitting fiber endings;
   (e) a retro-reflective material located a distance above said matrix;
   (f) a semi-transparent deformable medium located between said matrix and said retro-reflective material, said semi-transparent deformable medium supporting said retro-reflective material;
   (g) a flexible membrane located adjacent said retro-reflective material side farthest from said matrix; and
   (h) means located adjacent said receiving fiber sub-array, for detecting said reflected light transmitted by said light fibers from said matrix to said receiving fiber sub-array.

2. The sensor of claim 1, wherein said retro-reflective material comprises an adhesively backed sheet affixed to said flexible membrane by said adhesive.

3. The sensor of claim 1, wherein said semi-transparent deformable medium is heavy ink.

4. The sensor of claim 1, wherein said semi-transparent deformable medium is graphite oil.

5. The sensor of claim 1, wherein said flexible membrane is silicone elastomer.

6. The sensor of claim 1, wherein said light transmitting fibers are glass fibers.

7. The sensor of claim 1, wherein said matrix comprises rows and columns of fibers which alternately are transmitting fibers and receiving fibers, said transmitting fibers extending from said matrix to said transmitting fiber sub-array, and said receiving fibers extending from said matrix to said receiving fiber sub-array.

* * * * *